(12) United States Patent
Hao

(10) Patent No.: US 8,775,643 B2
(45) Date of Patent: Jul. 8, 2014

(54) REALIZING METHOD OF EMERGENCY CALL REGISTRATION

(71) Applicant: ZTE Corporation, Shenzhen (CN)

(72) Inventor: Zhenwu Hao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/705,075

(22) Filed: Dec. 4, 2012

(65) Prior Publication Data
US 2013/0095782 A1 Apr. 18, 2013

Related U.S. Application Data

(63) Continuation-in-part of application No. 12/522,173, filed as application No. PCT/CN2007/003595 on Dec. 14, 2007, now abandoned.

(30) Foreign Application Priority Data

Jan. 5, 2007 (CN) .......................... 2007 1 0000127

(51) Int. Cl.
| | |
|---|---|
| G06F 15/16 | (2006.01) |
| H04L 29/06 | (2006.01) |
| H04L 29/08 | (2006.01) |
| H04L 12/24 | (2006.01) |
| H04W 76/00 | (2009.01) |
| H04W 28/18 | (2009.01) |
| H04W 4/02 | (2009.01) |
| H04W 8/18 | (2009.01) |
| H04W 4/22 | (2009.01) |

(52) U.S. Cl.
CPC ........ H04L 65/1073 (2013.01); H04L 65/1006 (2013.01); H04L 65/1069 (2013.01); H04L 67/18 (2013.01); H04L 41/0893 (2013.01); *H04W 4/22* (2013.01); *H04W 76/007* (2013.01); *H04W 28/18* (2013.01); *H04W 4/02* (2013.01); *H04W 8/18* (2013.01); *H04M 2242/04* (2013.01); *H04M 2242/30* (2013.01)
USPC ..... 709/228; 709/229; 455/404.1; 455/404.2; 455/432.1; 379/37

(58) Field of Classification Search
CPC ..... H04W 4/22; H04W 76/007; H04W 28/18; H04W 4/02; H04W 8/18; H04L 65/1006; H04L 65/1069; H04L 65/1073; H04L 67/18; H04L 41/0893; H04M 2242/04; H04M 2242/30
USPC ......... 709/228, 229; 455/404.1, 404.2, 432.1; 379/37
See application file for complete search history.

(56) References Cited

U.S. PATENT DOCUMENTS

| | | | |
|---|---|---|---|
| 8,335,485 B2 * | 12/2012 | Tuohino et al. | ............ 455/404.2 |
| 2003/0032434 A1 * | 2/2003 | Willner et al. | ................ 455/456 |

(Continued)

*Primary Examiner* — Oleg Survillo
(74) *Attorney, Agent, or Firm* — John A. Artz; Dickinson Wright LLC

(57) ABSTRACT

A realizing method of emergency registration is disclosed. When the user equipment in the visited network initiates an emergency registration request, the method comprises the following steps: after P-CSCF of the visited network receives the emergency registration request sent from the user equipment, it forwards the message to S-CSCF of the home network. The S-CSCF sets the emergency registration expiration time according to the setting policy for emergency registration expiration time, includes it into the emergency registration response sent to the P-CSCF which retrieves the emergency registration expiration time from the emergency registration response and sends the message to the user equipment, which in turn retrieves the emergency registration expiration time from the emergency registration response. The factors of the setting policy for the emergency registration expiration time comprise: a type of the emergency call, the location information of the visited network and the location information of the user equipment.

6 Claims, 3 Drawing Sheets

(56) References Cited

U.S. PATENT DOCUMENTS

| | | | |
|---|---|---|---|
| 2006/0271693 A1* | 11/2006 | Thiebaut et al. | 709/229 |
| 2008/0025261 A1* | 1/2008 | Riley | 370/331 |
| 2009/0147929 A1* | 6/2009 | Zhao | 379/46 |
| 2009/0280770 A1* | 11/2009 | Mahendran | 455/404.1 |
| 2009/0310758 A1* | 12/2009 | Tuohino et al. | 379/37 |
| 2010/0246780 A1* | 9/2010 | Bakker et al. | 379/38 |

* cited by examiner

REALIZING METHOD OF EMERGENCY CALL REGISTRATION

CROSS-REFERENCE TO RELATED APPLICATIONS

This application is a continuation-in-part application of U.S. patent Ser. No. 12/522,173, filed on Jul. 5, 2009, and entitled "Realizing Method Of Emergency Call Registration", the disclosure of which is incorporated herein by reference in its entirety for all purposes.

TECHNICAL FIELD

The present invention relates to the field of communication, and more specifically, to a realizing method of registering the emergency call service in an IP multimedia core network subsystem.

BACKGROUND

According to regulations specified by countries and local telecommunication management departments, the telecommunication network should offer emergency voice call service. When users call the emergency call number, use default emergency call number saved in terminal equipment, or use emergency call identification to initiate an emergency call, the network will send the emergency call to public safety answering centre, such as police, fire police, ambulance, rescue, and so on.

Internet Protocol (IP) Multimedia Core Network Subsystem (IMS) also should provide emergency call service.

FIG. 1 is a reference framework of the IMS emergency call system. The whole framework comprises User Equipment (UE) 101, Proxy Call Session Control Function (P-CSCF) 102, Serving Call Session Control Function (S-CSCF) 103, Home Subscriber Server (HSS) 104, Emergency Call Session Control Function (E-CSCF) 105, Location Retrieval Function (LRF) 106 and Public Safety Answering Point (PSAP) 107, also it involves function entities (not shown in FIG. 1) such as Interconnection Border Control Function (IBCF) and Interrogating Call Session Control Function (I-CSCF) during the call.

In the method, E-CSCF 105 is a new function entity introduced into the IMS domain, it is in the same network (the visited network in which the user is roaming) as the P-CSCF is, and is responsible for receiving emergency call establishment request from P-CSCF 102, and routes the emergency call establishment request to PSAP 107 connected to the IP network through the Mm interface, or to PSAP 107 connected to the PSTN (Public Switched Telephone Network) through the Mi/Mg interface according to location information offered by the UE or location information and routing information obtained from LRF 106. Meanwhile, PSAP 107 can directly obtain the location information of the UE from the IRF 106 through Le interface, and communicate with its home network through Mm/Mw interface.

According to the service requirement of the IMS emergency call service, if the UE has enough authentication parameters and can detect emergency calls, the UE should use emergency public user identification to perform the process of IMS emergency call registration to home network through the P-CSCF of the visited network. This process is similar to the process of normal IMS registration. During the registration, the registration expiration time should be determined. For a normal IMS registration, the UE should initiate the procedure of re-registration in the registration expiration time period, renew the registration expiration time timer, and notify the network that the UE is in the registered status. If the registration timer is expired, the network (including P-CSCF and S-CSCF) and the UE will perform the process of de-registration to release the information related to the registration and the corresponding call. For emergency registration, the UE is not allowed to initiate the process of emergency re-registration, and if the registration timer is expired, the network (including P-CSCF and S-CSCF) and the UE will release the emergency registration. Only there is an emergency call going on, will the UE be allowed to initiate the process of emergency call re-registration.

In the related art, the process of emergency registration and the process of registration expiration time are shown in FIG. 2, which comprise the following steps:

201: When the UE detects that the call is an emergency call and it has enough authentication parameters, it uses the emergency call public user identification to send an emergency registration request including the registration expiration time, for example, the registration expiration time is set as 600000 seconds, to the P-CSCF;

202: When the P-CSCF receives the emergency registration request, it does not process the registration expiration time, and meanwhile forwards the request to the I-CSCF of the access point of the home network of the UE;

203: the I-CSCF sends S-CSCF assignment request message to the HSS to ask for S-CSCF assignment;

204: the HSS returns the S-CSCF assignment response message including the assigned S-CSCF address or S-CSCF capabilities to the I-CSCF;

205: the I-CSCF sends the emergency registration request message to the selected S-CSCF;

206: the S-CSCF sends user profile data request to the HSS;

207: the HSS saves the information of the S-CSCF, and returns the profile data and security information of the user to the S-CSCF by sending the user profile response message;

208: the S-CSCF processes the emergency call registration service logic, and decides the emergency registration expiration time according to policy of the home network;

Wherein the policy of the home network only considers the characteristic of the home network, but does not consider the call type, the requirement of the visited network, and so on, for example, the registration expiration time is uniformed regardless of the location of the user.

209: the S-CSCF constructs the emergency call registration response including the emergency call registration expiration time decided in step 208, and sends the response to the I-CSCF;

210: the I-CSCF forwards the emergency registration response to the P-CSCF;

211: the P-CSCF obtains the emergency registration expiration time determined by the S-CSCF from the emergency registration response;

212: the P-CSCF forwards the emergency registration response to the UE;

213: the UE obtains the emergency registration expiration time from the emergency registration response.

From the above process, it can be seen that the emergency call registration expiration time is decided by the S-CSCF of the home network according to the policy of the home network which does not consider the requirements of the visited network to the emergency registration expiration time. When the registration is expired, the S-CSCF, P-CSCF and UE on the session path will respectively perform the process of emergency call de-registration to release the local registration information.

According to the requirement of emergency call service, the emergency call service is serviced by the visited network, and after successful registration, the subsequent emergency session is controlled by the visited network, and the home network will not participate in the subsequent session.

Due to different regulations in the telecommunication management departments of the visited networks, each visited network has different time requirements for the registration expiration. For example, for emergency call of rescue, the time set in place A is half an hour, while place B is one hour, which requires the network and the user terminal to sustain the status of registration for a certain time after the emergency registration in order to meet the requirements of calling back, searching and rescuing. When a user in place A roaming to place B initiates an emergency call, the emergency call registration time will still use the setting of his home place according to the related art, that is, the expiration time is half an hour, while in practice, the registration expiration time required in place B is one hour, and thus it will not meet the requirement of emergency call service in place B.

Moreover, since the registration expiration time set by each home network is different, there is possibility that in the same visited network, the roaming users of different home networks and the local users have different registration expiration times, which will make the emergency call service characteristic inconsistent, thus making the application and management of the emergency call service more complicated.

From the above description, it can be seen that the present IMS emergency call registration has defects in processing the registration expiration time. Since the method of the home network setting the registration expiration time will make the registration expiration times of the users of different home networks different in one network, the requirements of emergency call service of the visited network may not be satisfied, and the consistence of the emergency call service characteristic will be affected, thus having the difficulty in the application and management of the emergency call service.

SUMMARY OF THE INVENTION

The present invention offers a realizing method of the emergency call registration to solve the problem in the present emergency registration and to meet the requirements of emergency call service for the users in different visited networks.

The present invention offers a realizing method of the emergency registration, wherein, when the UE roaming in the visited network initiates an emergency registration request, the method comprises the following steps:

a) After the P-CSCF of the visited network receives the message of the emergency registration request from the UE; it sends the message to the S-CSCF of the home network of the UE;

b) Said S-CSCF sets the emergency registration expiration time according to the setting policy for emergency registration expiration time saved in it, includes the emergency registration expiration time into the emergency registration response message to send to the P-CSCF;

c) The P-CSCF obtains the emergency registration expiration time included in the emergency registration request message and sends it to the UE; said UE obtains the emergency registration expiration time from the emergency registration response message;

The emergency registration expiration time setting policy of the visiting network includes the following factors: a type of an emergency call, location information of the visited network and location information of the user.

Furthermore, the UE inserts the location information of the user in the message of emergency registration request.

Furthermore, in step a), after said P-CSCF receives the emergency registration request, it inserts its own network identification into the message and then sends the message to the S-CSCF;

In step b), said S-CSCF obtains the location information of the visited network according to the above network identification and sets the emergency registration expiration time.

Furthermore, said S-CSCF saves the emergency registration expiration time setting policy of the visited network which has roaming protocol with its home network;

In step b), the emergency registration expiration time is set according to the location information of the visited network and the emergency registration expiration time setting policy of the corresponding visited network.

Furthermore, between step a) and step b), it also comprises the following steps, a1) after the S-CSCF receives the emergency registration request message, it obtains the value of the emergency registration expiration time included in the message;

In step b), the smaller one of the value of the above obtained emergency registration expiration time and the value of the emergency registration expiration time set according to said emergency registration expiration time setting policy acts as the emergency registration expiration time.

Furthermore, said P-CSCF and S-CSCF determines whether the request is an emergency registration request or a normal registration request according to whether the registration request has the emergency public user identification or not.

Furthermore, said location information of user comprises: the geographical location of the user, and/or the cell identification of the mobile network.

To sum up, by applying the method of the present invention to the process of emergency registration in the IP multimedia core network subsystem, the emergency registration expiration time setting policy is set according to the regulation of the visited network, and the emergency registration expiration time is set by the P-CSCF or the S-CSCF according to the emergency registration expiration time setting policy, thus making the emergency registration expiration time meet the requirement of the telecommunication management department of the visited network, and making the emergency call service characteristics of the visited network consistent.

DESCRIPTION OF THE PREFERRED EMBODIMENTS

In the following, the present invention will be described in further detail with reference to the accompanying figures and the embodiments.

Figure 1:
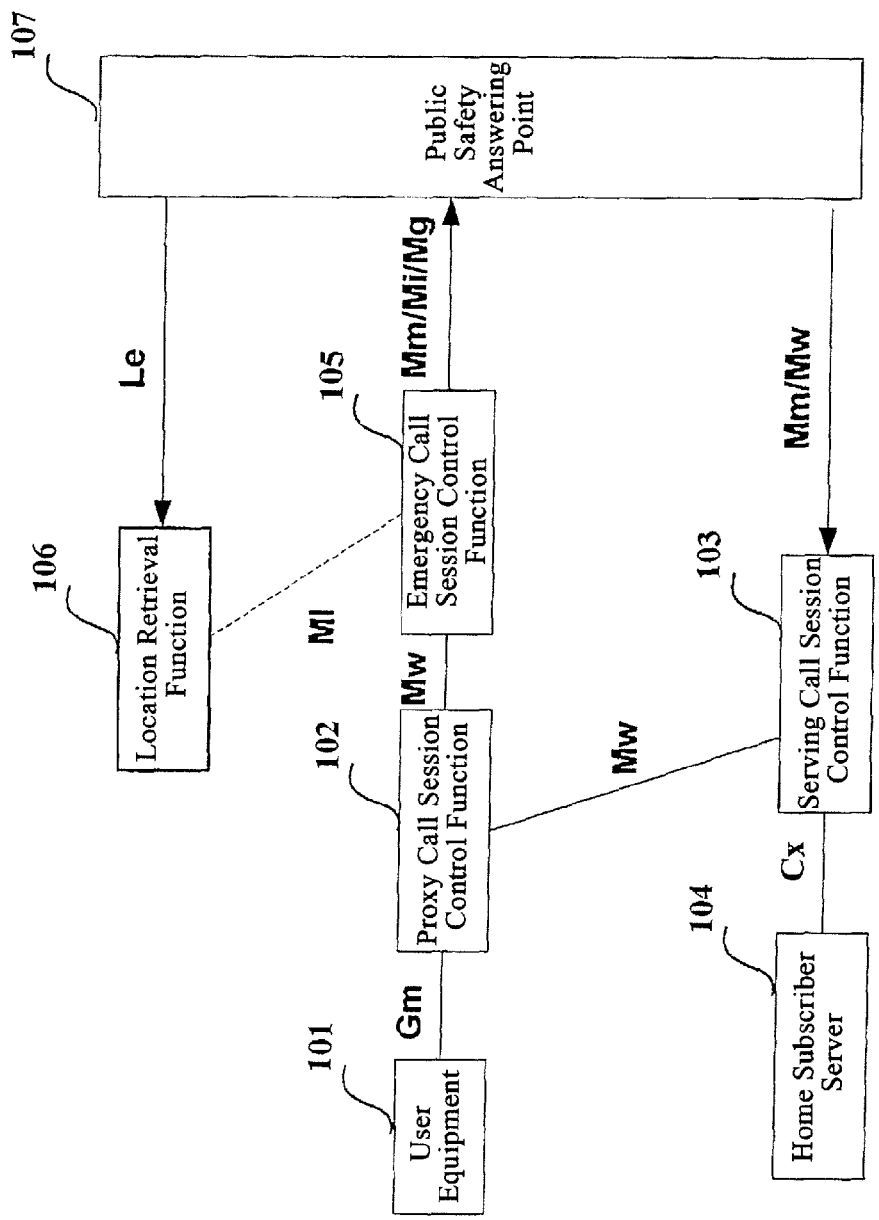
FIG. 1 is an illustration of the reference framework of the IMS emergency call in the related art.
Figure 2:
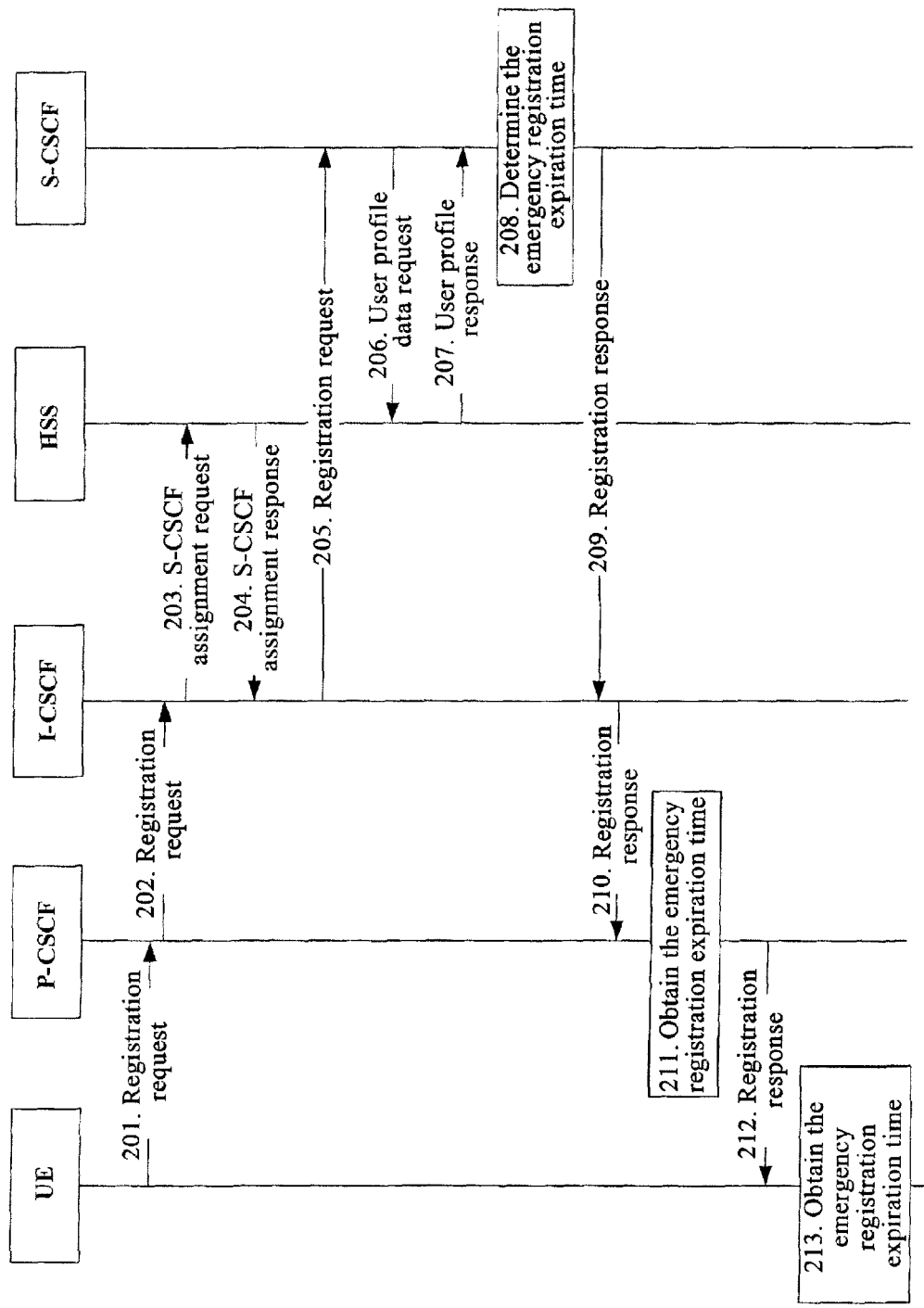
FIG. 2 is a flow chart of the emergency registration and the process for processing the emergency registration expiration time in the related art.
Figure 3:
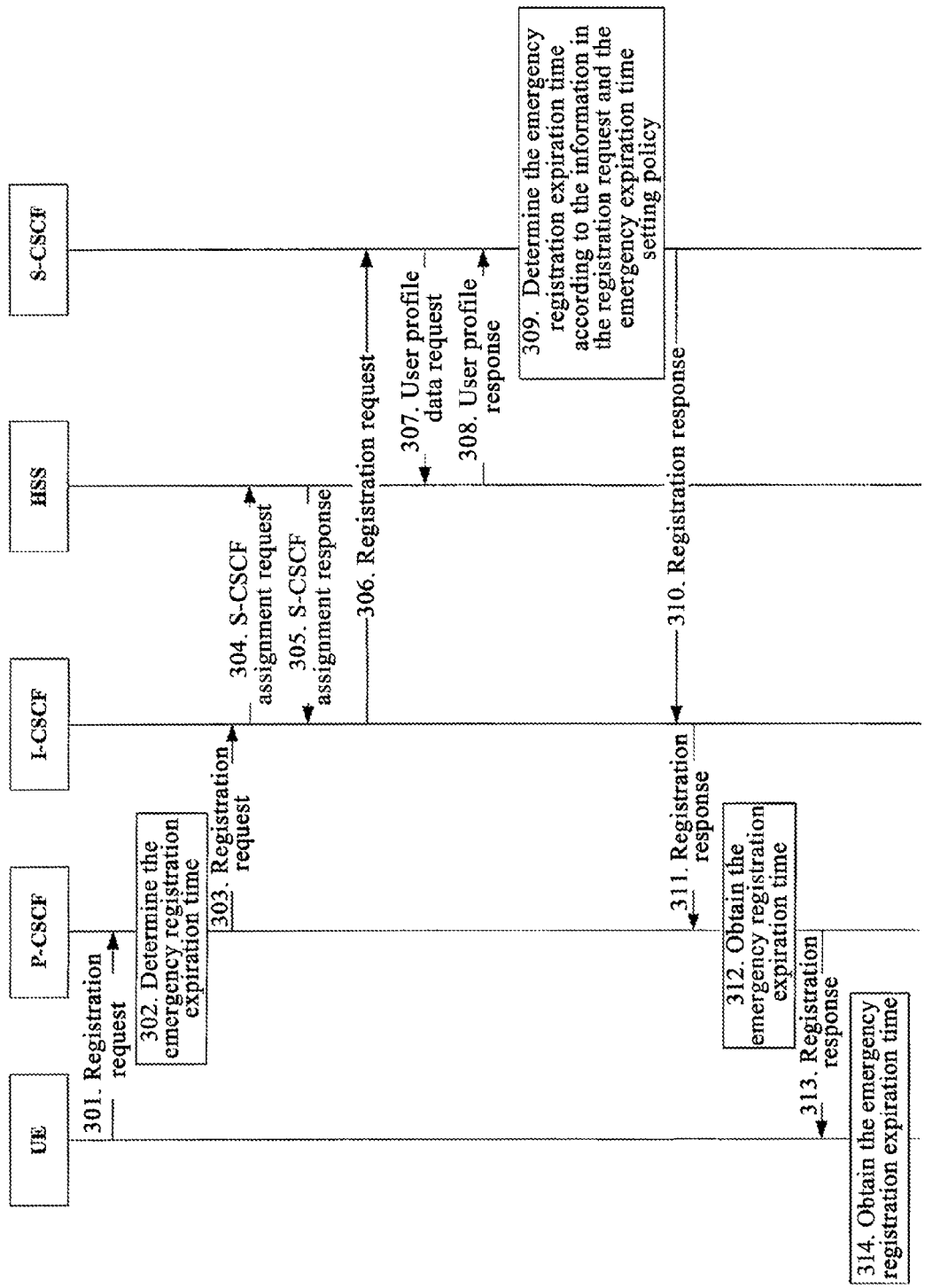
FIG. 3 is a flow chart of the emergency registration and the process for processing the emergency registration expiration time in accordance with an embodiment of the present invention.

FIG. 3 is a flow chart of the emergency registration and the process for processing the emergency registration expiration time in accordance with an embodiment of the present invention, which describes the improved process of the emergency registration, especially the process for processing the emergency registration expiration time.

The method of the present invention needs to configure the emergency registration expiration time setting policy in the IMS network, and saves the policy in the P-CSCF and S-CSCF. The policy configures different emergency registration expiration times according to different factors including the information such as type of the emergency call, the location of the visited network and the location of the user, and the specifically-configured expiration time should conform to the regulations of the telecommunication management department in the visited network. Wherein, since the P-CSCF is in the visited network, only the local emergency registration expiration time setting policy needs to be saved, or it may not be saved; while the S-CSCF of the home network should save the emergency registration expiration time setting policy of the network which has roaming protocol with it (that is, the corresponding setting is performed according to the emergency registration expiration time required by the visited network).

When a user initiates an IMS emergency and an emergency registration should be performed, the method comprises the following steps:

301: When the UE determines that the is an emergency call and has enough authentication parameters, it uses the emergency public user identification to send the emergency registration request including the emergency registration expiration time to the P-CSCF of the visited network.

Suppose the emergency registration expiration time is set as 600000 seconds, this value is included in the Expires header field or Expires parameters in the Contact header field in the registration request message.

When the UE initiates an emergency registration, it could insert the location information of UE, such as the geographic location of the user, the cell identification of the mobile network, and so on, into the registration request message; the network (including the P-CSCF and the S-CSCF) could obtain the user's location through the above location information. However, the method for the network to obtain the user's location is not limited to this.

302: After the P-CSCF of the visited network receives the registration request message, if it determines that the request is emergency registration and the P-CSCF has the local emergency registration expiration time setting policy, it will decide (set) the emergency registration expiration time according to the local policy (i.e. the emergency registration expiration time setting policy of the visited network);

For normal calls, the P-CSCF does not need to set the registration expiration time.

Whether the registration request is an emergency registration request can be determined by the P-CSCF of the visited network checking the user identification in the registration request; if it is an emergency public user identification, the request is considered to be an emergency registration request, yet the method for determining an emergency registration request does not limit to this.

The factors of the local emergency registration expiration time setting policy of the P-CSCF include but not limit to: type of the emergency call, the location of the user, and so on. According to different factors, the emergency registration expiration times may be different.

Moreover, the P-CSCF does not need to be required to determine the emergency registration expiration time in the emergency registration request. This mainly considers the following two conditions: 1) the P-CSCF may not support the method of the P-CSCF setting the emergency registration expiration time; 2) The visited network has no special requirement for the emergency expiration time.

303: the P-CSCF forwards the registration request to the I-CSCF of the access point of the home network of the user; and the registration request includes the emergency registration time;

When the P-CSCF forwards the emergency registration request message to the home network, it could insert its network identification in the header field of the P-Visited-Network-ID in the request message, and the home network (S-CSCF) could obtain the information of the visited network in which the present user locates currently through the network identification.

The P-CSCF could explicitly or implicitly notify the emergency registration time determined by the P-CSCF to the home network by modifying the emergency expiration time set by the UE in the registration request message, explicitly inserting the emergency expiration time determined in step 302 into the registration request message, or modifying the emergency expiration time set by the UE in the registration request message and meanwhile explicitly inserting the modification identification.

For example, the P-CSCF determines the registration expiration time as 3600 seconds, then it could apply the following method to show it:

1) Directly modify the value in the expires parameter in the Contact header field or in the Expires header field from 600000 seconds to 3600 seconds (implicitly insert);

2) Add new header field (such as vexpires) or new parameter (such as adding vexpires in the Contact header field) to explicitly demonstrate that the expiration time determined by the P-CSCF is 3600 seconds (explicitly insert);

3) On the basis of 1), add identification in the Expires header field or the Contact header field to show that the expiration time is the information (such as vset) set by the visited network (explicitly insert).

304: the I-CSCF sends S-CSCF distribution request message to the HSS to ask for S-CSCF assignment;

305: the HSS returns the S-CSCF assignment response message including the assigned S-CSCF address or the S-CSCF capabilities to the I-CSCF;

306: the I-CSCF sends the emergency registration request message to the selected S-CSCF;

307: the S-CSCF sends user profile data request to the HSS;

308: the HSS saves the information of S-CSCF and returns configuration data and security information of the user to the S-CSCF by sending user profile response message;

309: if the S-CSCF determines that the request is an emergency registration request, it determines the emergency registration expiration time according to the information included in the registration request and the local saved emergency expiration time setting policy;

Of course, the S-CSCF can also obtain the emergency registration expiration time directly from the emergency registration request.

The information included in the above registration message comprises: the location information of the UE, the P-CSCF network identification, type of call, and so on.

For normal registrations, the S-CSCF sets the expiration time according to the configuration of its home network without considering the factors of the visited network; however, for emergency registrations, the S-CSCF could set the emergency expiration time according to the emergency registration expiration time setting policy in which the regulation of the telecommunication management department in the visited network is considered.

The S-CSCF could determine whether the registration request is an emergency registration request or not by checking the user identification in the registration request; if it is, then the request is considered as an emergency registration request.

In this process, the S-CSCF checks the information carried in the emergency registration request:

If the S-CSCF finds out that the P-CSCF explicitly inserts the emergency expiration time or modifies identification in step 303, it means that the P-CSCF of the visited network has determined the emergency registration expiration time according to the regulations in the visited network, and the S-CSCF will obtain the emergency expiration time inserted or modified by the P-CSCF in step 303 from the registration request, and use it as the emergency registration expiration time.

Otherwise, the S-CSCF obtains the location of the visited network (the P-CSCF network identification), location information of the user from the emergency registration request; and uses the above information to select a suitable emergency expiration time according to the emergency registration expiration time setting policy, and further combines it with the emergency registration time set by the UE (or modified by the P-CSCF but not explicitly declared, at this time, the value should be the same with the emergency expiration time selected by the S-CSCF according to the emergency registration expiration time setting policy), in which the smaller value is selected as the emergency expiration time.

The factors of the above emergency registration expiration time setting policy comprise but not limit to: type of the emergency call, the position of the visited network (the P-CSCF network identification), the location of user, and the emergency registration expiration times are different corresponding to different factors.

310: the S-CSCF constructs the emergency registration response including the emergency registration expiration time determined in step 309 and sends the response to the I-CSCF;

311: the I-CSCF forwards the emergency registration response to the P-CSCF;

312: the P-CSCF obtains the emergency registration expiration time from the emergency registration response and forwards this response to the UE;

313: the P-CSCF forwards the emergency registration response to the UE;

314: the UE obtains the emergency registration expiration time from the emergency registration response.

After the above emergency registration is successfully performed, the UE, P-CSCF and S-CSCF will set and restart their own expiration time timers according to the set emergency registration expiration time. When it expires, the UE, P-CSCF and S-CSCF will respectively perform the process of emergency de-registration. Only the UE is in the process of emergency call, will the UE perform the process of re-registration to ensure that the present call can be continue.

In the related art, the emergency registration time is set by the S-CSCF of the home network according to the policy of the home network (step 208), while in the present invention, it is set according to the regulation of the visited network, when the UE initiates an emergency registration, the P-CSCF or the S-CSCF sets the emergency registration expiration time according to the emergency expiration time setting policy (step 302 and step 309).

INDUSTRIAL APPLICABILITY

To sum up, by applying the method of the present invention to the process of emergency service registration in the IP multimedia core network subsystem, the emergency registration expiration time setting policy is set according to the regulation of the visited network, and the emergency registration expiration time is set by the P-CSCF or the S-CSCF according to the emergency registration expiration time setting policy, thus making the emergency registration expiration time meet the requirements of the telecommunication management department of the visited network, and making the emergency service characteristics of the visited network consistent.

What is claimed is:

1. A realizing method of an emergency registration in an Internet Protocol (IP) Multimedia Core Network Subsystem (IMS), wherein when a User Equipment roaming in a visited network initiates an emergency registration request, the method comprises the following steps of:
   a) after receiving an emergency registration request message from the User Equipment, a Proxy Call Session Control Function of the visited network sending the emergency registration request message to a Serving Call Session Control Function of a home network of the User Equipment;
   b) said Serving Call Session Control Function setting an emergency registration expiration time according to an emergency registration expiration time setting policy of the visited network saved within the Serving Call Session Control Function, including the emergency registration expiration time into an emergency registration response message, and sending the emergency registration response message to the Proxy Call Session Control Function;
   c) the Proxy Call Session Control Function obtaining the emergency registration expiration time included in the emergency registration response message and sending the emergency registration response message to the User Equipment; said User Equipment obtaining the emergency registration expiration time from the emergency registration response message;
   wherein the emergency registration expiration time setting policy of the visited network includes the following factors: a type of an emergency call, location information of the visited network and location information of a user;
   said Serving Call Session Control Function saves, prior to receiving the emergency registration request message, the emergency registration expiration time setting policy of the visited network which has roaming agreement with the home network;
   in step b), the emergency registration expiration time is set based on the type of the emergency call, the location information of the visited network, and the location information of the user obtained from the emergency registration request message.

2. The method of claim 1, wherein the User Equipment inserts the location information of the user into the emergency registration request message.

3. The method of claim 2, wherein said location information of the user comprises at least one of: a geographical location of the user and a cell identification of a mobile network.

4. The method of claim 1, wherein,
   in step a), after said Proxy Call Session Control Function receives the emergency registration request message, the Proxy Call Session Control Function inserts a network identification of the visited network into the emergency registration request message;

in step b), said Serving Call Session Control Function obtains the location information of the visited network according to the network identification inserted and sets the emergency registration expiration time.

5. The method of claim 1, wherein between step a) and step b), the method also comprises the following steps: a1) after receiving the emergency registration request message, the Serving Call Session Control Function obtaining a value of the emergency registration expiration time included within the emergency registration request message;

in step b), a smaller one of the value of the obtained emergency registration expiration time and a value of the emergency registration expiration time set according to said emergency registration expiration time setting policy acts as the emergency registration expiration time included in the emergency registration response message.

6. The method of claim 1, wherein said Proxy Call Session Control Function and said Serving Call Session Control Function determine whether the emergency registration request includes an emergency public user identification.

* * * * *